United States Patent [19]

Hanemaayer

[11] Patent Number: 4,699,207
[45] Date of Patent: Oct. 13, 1987

[54] RECREATIONAL VEHICLE INCORPORATING AN INTEGRATED VENTING SYSTEM

[75] Inventor: Jacobus N. Hanemaayer, Kitchener, Canada

[73] Assignee: Hanmar Home Equipment Limited, Kitchener, Canada

[21] Appl. No.: 792,643

[22] Filed: Oct. 29, 1985

[30] Foreign Application Priority Data

Sep. 24, 1985 [CA] Canada .................................. 491406

[51] Int. Cl.⁴ ............................................. F28F 27/00
[52] U.S. Cl. ..................................... 165/41; 98/121.1; 126/85 B; 126/299 D
[58] Field of Search ............. 296/22, 156, 24 A, 24 B, 296/208; 98/121.1; 126/85 B, 299 D; 62/236, 239, 244; 165/41

[56] References Cited

U.S. PATENT DOCUMENTS

| | | |
|---|---|---|
| 2,664,808 | 1/1954 | Peterson ........................ 98/40.18 X |
| 3,162,497 | 12/1964 | Boswinkle et al. ............ 98/115.4 X |
| 3,530,848 | 9/1970 | Wilhoite ............................ 126/85 B |
| 3,970,067 | 7/1976 | Vaughn ........................... 296/156 X |
| 4,286,569 | 9/1981 | Bergman et al. ................... 126/85 B |
| 4,550,046 | 12/1985 | Riffel et al. ..................... 126/299 D |
| 4,557,095 | 12/1985 | Rice et al. .......................... 98/121.1 |
| 4,601,509 | 7/1986 | Ellis, Sr. ................................ 296/22 |

FOREIGN PATENT DOCUMENTS

| | | |
|---|---|---|
| 64081 | 7/1899 | Canada . |
| 276590 | 12/1927 | Canada . |
| 366818 | 6/1937 | Canada . |
| 406107 | 7/1942 | Canada . |
| 466908 | 8/1950 | Canada . |
| 784473 | 5/1968 | Canada . |
| 853456 | 10/1970 | Canada . |
| 1037766 | 9/1978 | Canada . |
| 1136475 | 11/1982 | Canada . |
| 1150093 | 7/1983 | Canada . |

Primary Examiner—Harold Joyce
Attorney, Agent, or Firm—Cushman, Darby & Cushman

[57] ABSTRACT

A recreational vehicle, mobile home or the like having several appliances therein which generate heat and/or gases, such vehicle incorporating an integrated venting system. The venting system includes cool air inlets in a lower portion of the vehicle body and a common warm air outlet in another portion of the vehicle body located at a level above the cool air inlet. Means are disposed between the air inlet and the warm air outlet for confining the flow of air and causing such air flow to pass in contact with or in close proximity to the appliances and/or outlets therefrom whereby to remove heat and-/or gases from these appliances as the air moves from the air inlet to and through the air outlet.

23 Claims, 9 Drawing Figures

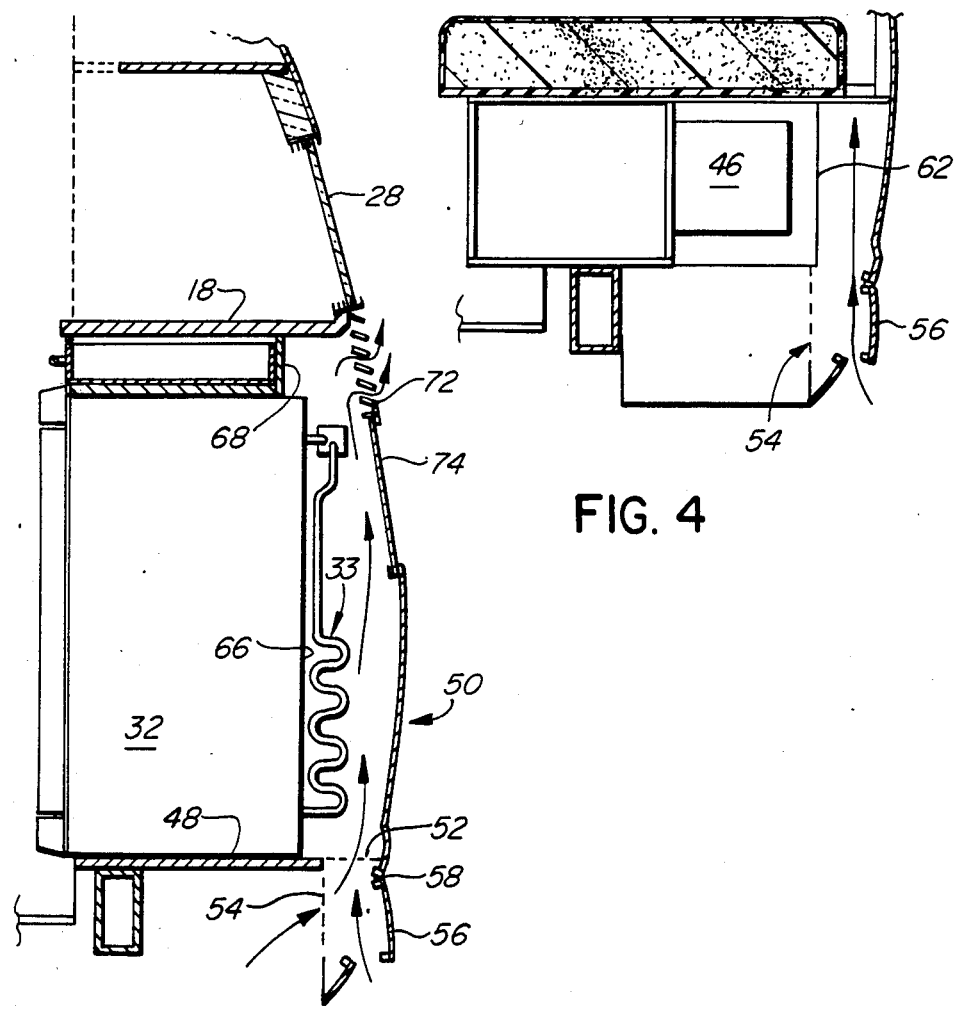
FIG. 4
FIG. 6
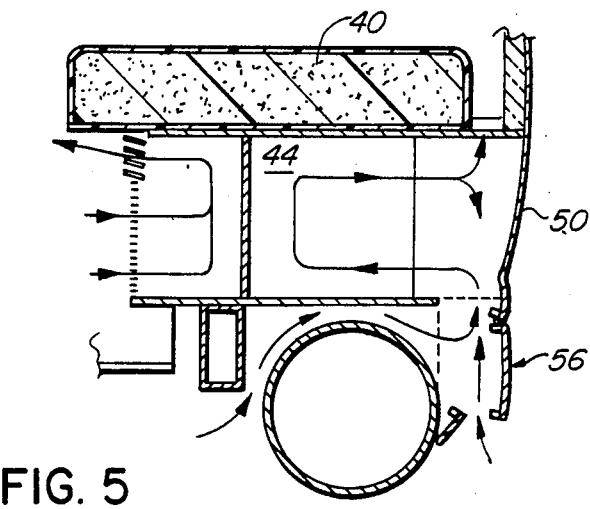
FIG. 5

RECREATIONAL VEHICLE INCORPORATING AN INTEGRATED VENTING SYSTEM

BACKGROUND OF THE INVENTION

This invention relates to recreational vehicles, mobile homes and the like having a plurality of appliances therein which generate heat and/or gases, with an integrated venting system in said vehicle for removing heat and/or gases from said appliances in a convenient and effective manner.

Vehicles of the type indicated above, including both motorized vehicles and trailers, commonly employ a number of appliances such as a stove, refrigerator and water heater. Any or all of these appliances may operate on gaseous fuel, commonly propane. Other appliances in the vehicle including the vehicle sink must be vented. In previously known arrangements, separate devices were commonly employed to vent the several appliances. As a result, several ventilating grills, screens and openings were scattered over a large area of the exterior of the previously known vans, motor homes and trailers to ventilate these fixtures and appliances. The grills or louvers on the outside walls and the vents and/or chimneys in the roof all tended to create a rather unpleasant appearance and they detracted greatly from the otherwise smooth appearance of the exterior of the vehicle. Furthermore, in addition to the eye-appeal aspect, the several ventilation fixtures and their associated duct work all tended to be relatively expensive and in many cases occupied otherwise usable space within the vehicle.

SUMMARY OF THE INVENTION

It is the basic object of the present invention to eliminate the unpleasant appearance associated with the ventilating grills, screens, chimneys and openings employed by previous vans, motor homes and trailers to ventilate their fixtures and to provide instead an integrated venting system having an attractive appearance and which at the same time is capable of efficiently and effectively venting the several fixtures and appliances.

Accordingly the present invention provides a recreational vehicle, mobile home or the like having several appliances therein which generate heat and/or gases, such vehicle incorporating an integrated venting system. The venting system includes cool air inlets in a lower portion of the vehicle body and a common warm air outlet in another portion of the vehicle body located at a level above the cool air inlet. Means are disposed between the air inlet and the warm air outlet for confining the flow of air and causing such air flow to pass in contact with or in close proximity to the appliances and/or outlets therefrom whereby to remove heat and/or gases from these appliances as the air moves from the air inlet to and through the air outlet.

In a typical embodiment of the invention the air inlet includes openings provided in or adjacent to floor portions of the vehicle. The common warm air outlet is located in a side wall of the vehicle body. The air outlet typically includes louvers covering the same to conceal the air outlet. Preferably, window units are provided closely adjacent the louver covered outlet to further conceal the outlet from view. Certain of these window units may be removable so as to allow access to the vehicle interior for installation and servicing of certain of the appliances.

A preferred form of the invention provides a single louvered and screened air outlet vent disguised in a window unit. A set of removable window units located below the louvers may be made of dark plexiglass. This gives the appearance of a normal window in the side of the vehicle but only upper transparent window units actually serve as a window.

The above-noted appliances typically include a stove. An exhaust hood is located above the stove with an exhaust duct and fan being provided to withdraw heat and fumes from the stove. This exhaust duct is connected to the means for confining the flow of air (the duct system) such that heat and fumes from the stove may be brought outwardly through the common air outlet, the latter being disposed at a level below that of the exhaust hood.

In one arrangement to be described hereafter, the vehicle has its kitchen facility located adjacent one side wall of the vehicle body with the appliances forming part of that facility. A main duct system for confining the flow of air therein is defined between the kitchen facility and the outer side wall of the vehicle body. Heat and/or gas emitting portions of the appliances are located within the main duct system to effect cooling/venting of same on movement of air through the system.

Further features and advantages of the invention will become apparent from the following description of a preferred embodiment of the invention taken in conjunction with the appended claims.

BRIEF DESCRIPTION OF THE VIEWS OF DRAWINGS

In drawings which illustrate an embodiment of the invention:

FIG. 4 is a section view taken along lines 4—4 of FIGS. 2 and 3 through the region of the converter/charger unit.

FIG. 5 is a section view taken along line 5—5 of FIGS. 2 and 3 through the air conditioning unit.

FIG. 6 is a section view taken along line 6—6 of FIGS. 2 and 3 generally at the refrigerator unit.

Figures 2, 2A:
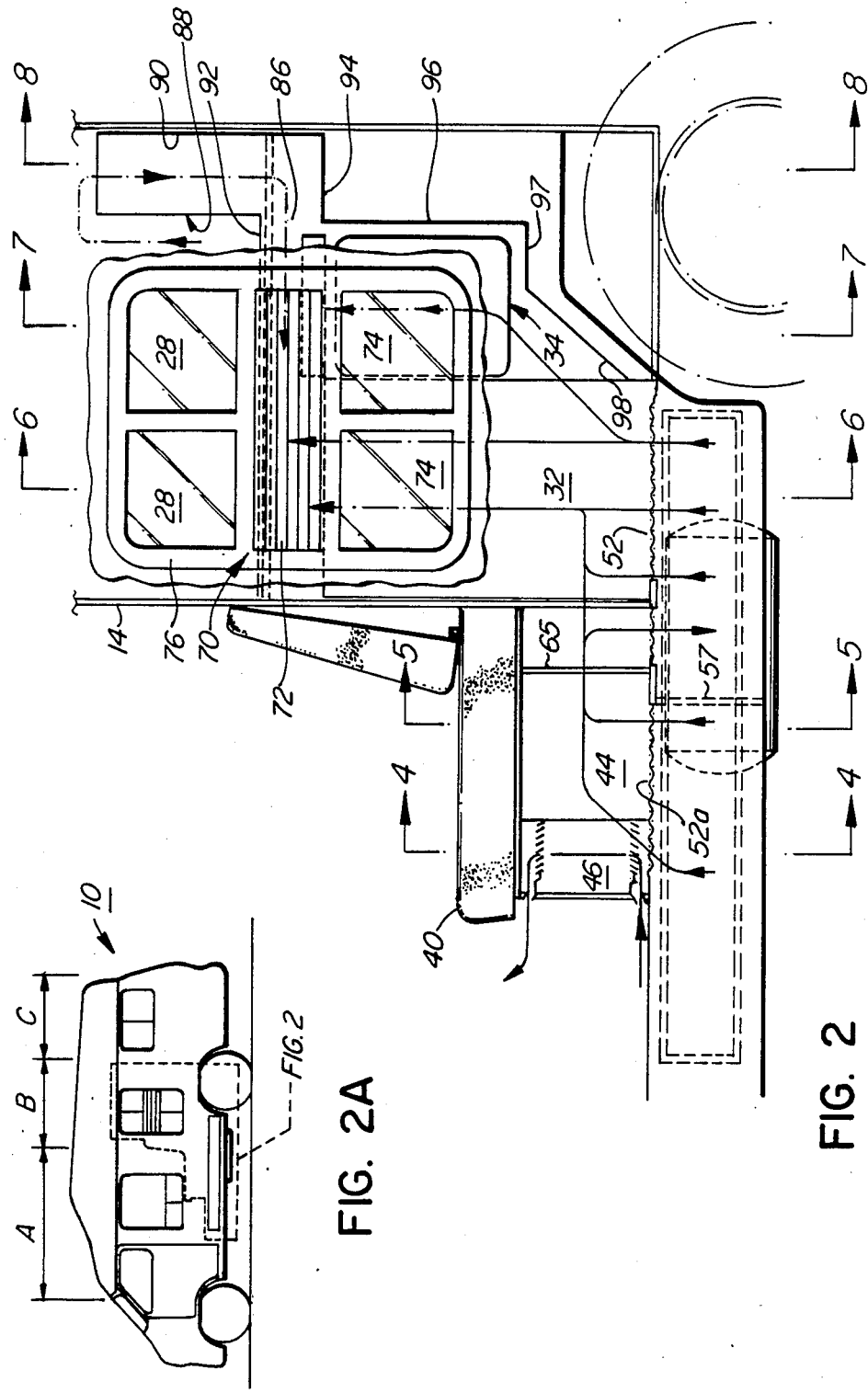
FIG. 2 is a fragmentary side elevation view of a recreational vehicle incorporating the integrated venting system, the side wall of the vehicle being cut away around the louvered outlet and its associated window unit thereby to show the underlying structure.
FIG. 2A is a side elevation view on a greatly reduced scale of a typical recreation vehicle with dashed lines surrounding that portion of the system generally depicted in FIG. 2.
Figure 3:
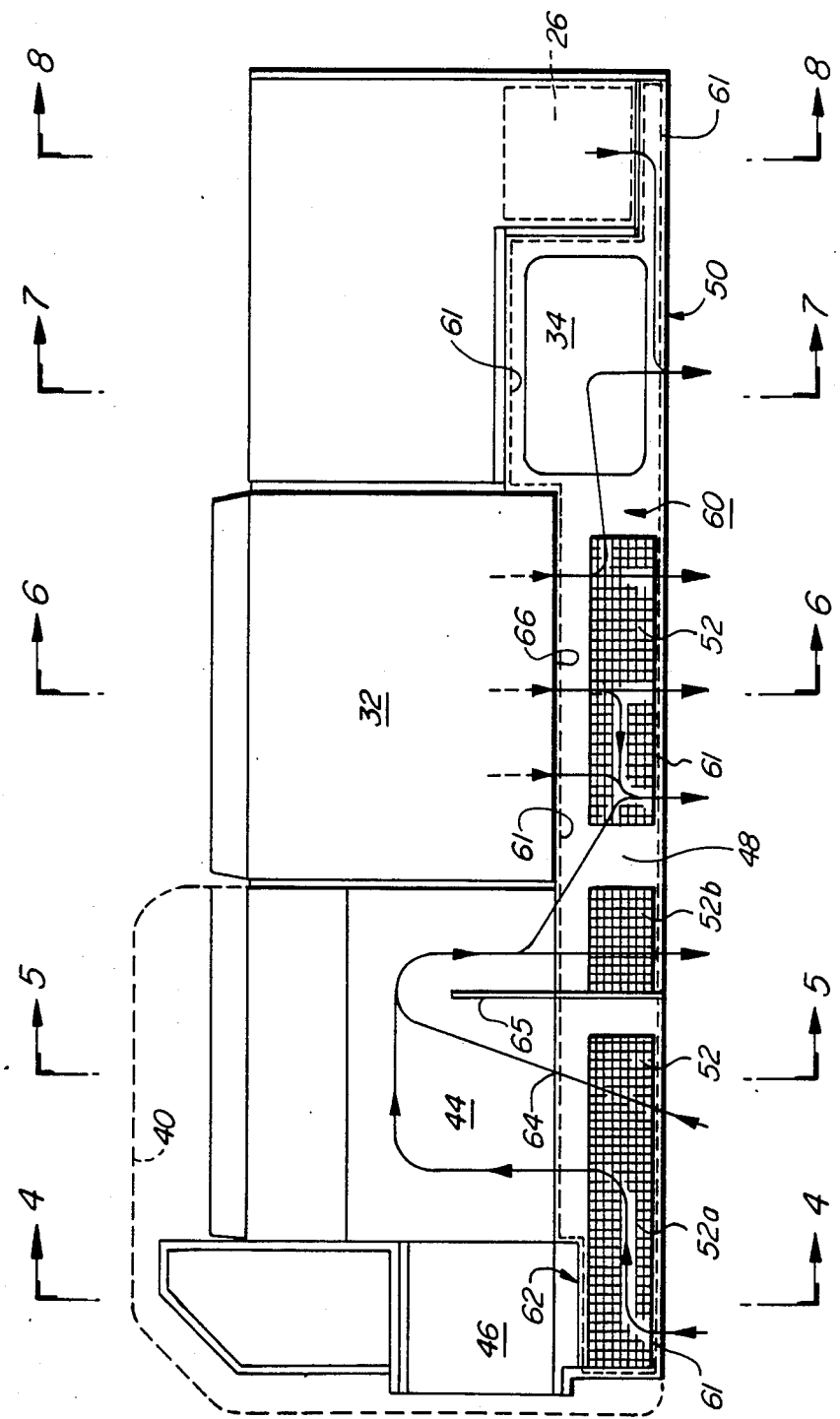
FIG. 3 is a plan view of a portion of the recreational vehicle showing the relationship of the air inlets and the perimeter of the duct system to the major vehicle appliances.
Figure 7:
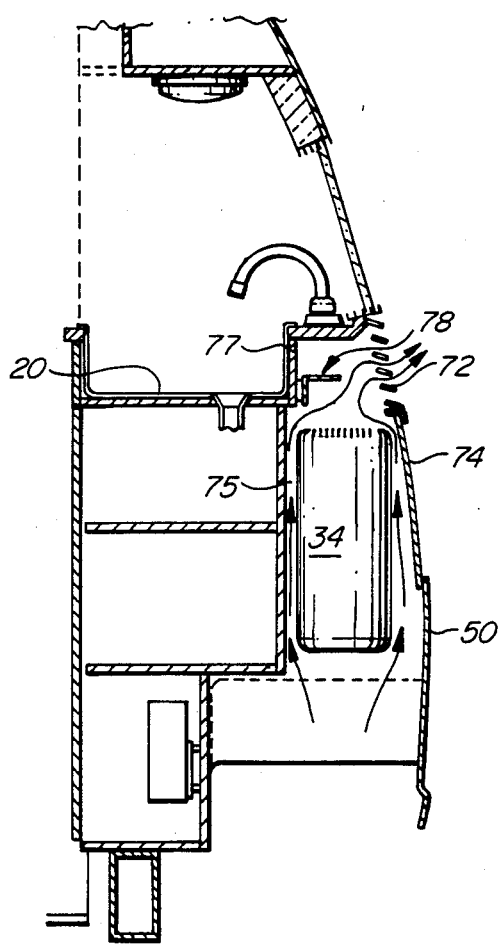
Figure 8:
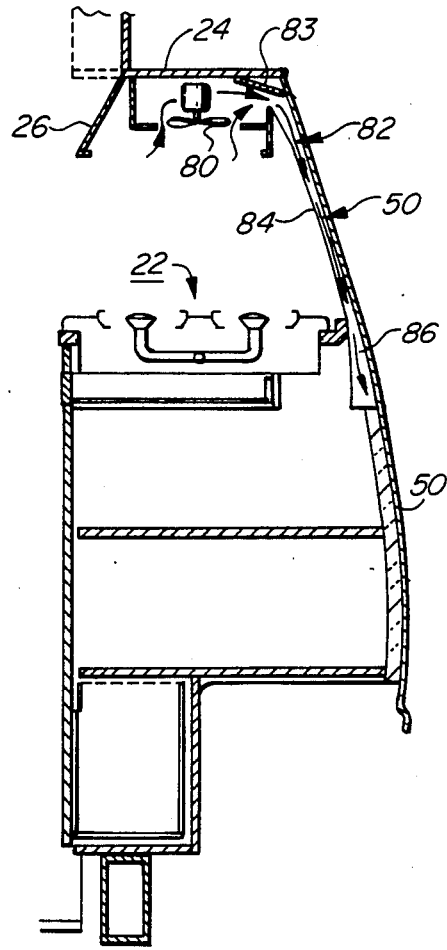

FIG. 7 is a section view taken through line 7—7 of FIGS. 2 and 3 generally at the gas water heater; and FIG. 8 is a section view taken along line 8—8 of FIGS. 2 and 3 generally at the location of the hooded exhaust fan.

DETAILED DESCRIPTION OF THE PREFERRED EMBODIMENT

Referring now to the drawings they is shown a recreational vehicle 10, the general interior layout of which may correspond to that described in my co-pending application Ser. No. 409,549 filed Aug. 19, 1982 now U.S. Pat. No. 4,550,946. As described in that application, and with reference to FIG. 2A herein, the vehicle includes a front seating Area A which, optionally, can be converted into a sleeping facility, a central utility compartment B containing on the one side thereof a kitchen facility 12, and on the opposite side thereof toilet and shower stall facilities (not shown), and a rear section C comprising a dining room facility which may be converted into a sleeping arrangement.

Figure 1:
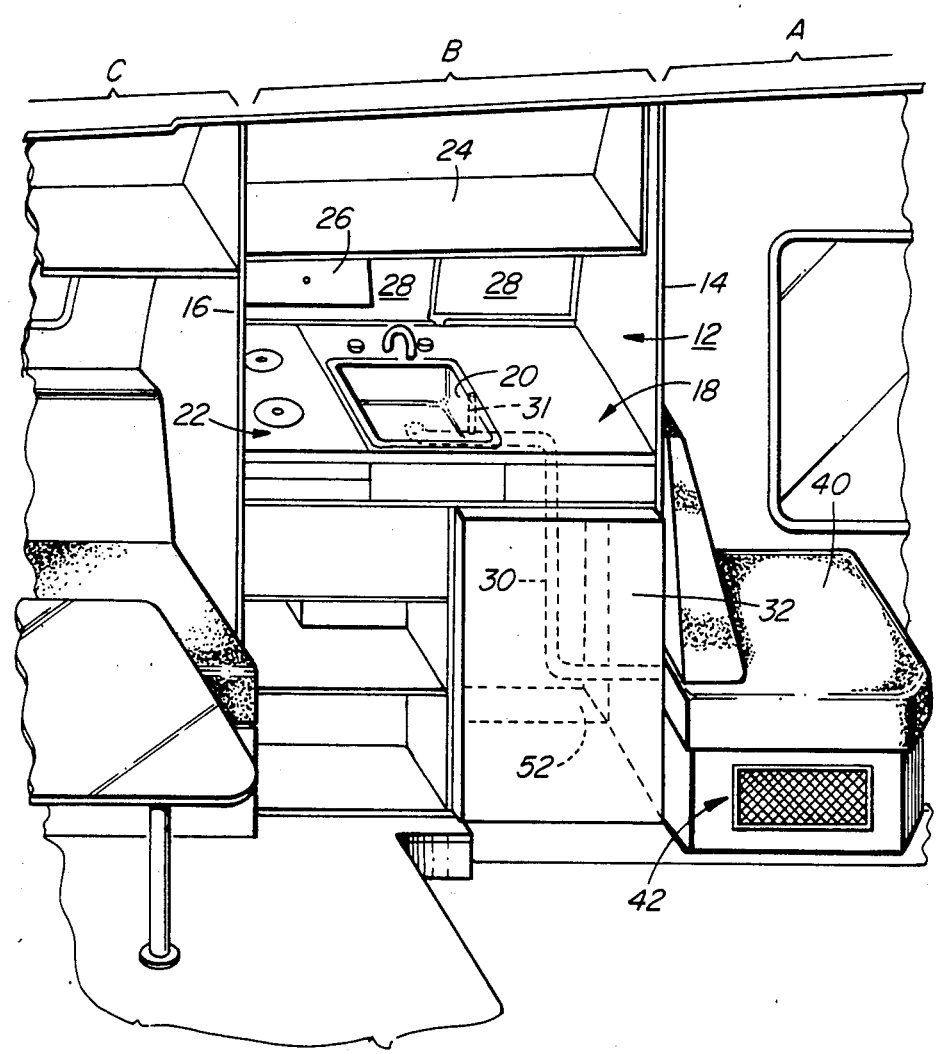
FIG. 1 is a perspective view of a portion of the vehicle interior showing a kitchen facility with portions of the venting system being shown in phantom.

FIG. 1 illustrates a typical kitchen facility 12 as it appears from the inside of the vehicle in section B referred to above, with portions of sections A and C disposed on opposing sides of same.

The kitchen facility 12, which is flanked by partitions 14 and 16 separating it from the adjacent sections A and C respectively, includes a kitchen countertop 18 having sink 20 disposed therein with a liquid propane stove 22 being positioned to one side of sink 20. A horizontal shelf 24 is positioned well above the countertop 18 and immediately below shelf 24 and connected to it is an exhaust hood 26, the exhaust hood 26 being disposed directly above the stove 22 to collect heat and fumes emitted therefrom. A pair of window panes 28 are mounted in a suitable framework (to be described hereafter) in the exterior wall of the vehicle 10 just above the level of the countertop.

The sink 20 is provided with a drain 30 (shown in dashed lines) connecting same to a waste tank (not shown), such drain line 30 being provided with a suitable vent 31 which is referred to hereafter. Positioned directly below the countertop 18 is a refrigerator 32 which may be operated by electricity or propane gas. Positioned generally beside the refrigerator, below stove 22 but displaced toward the side wall 50 of the vehicle, is a liquid propane gas water heater 34.

The above-noted items and appliances comprise the major components located in the kitchen/utility area B of the vehicle. The remaining items noted herein are conveniently located in the forward seating section A of the vehicle and, with reference to FIG. 1, it should be noted that there is a seating portion 40 located adjacent the side wall of the vehicle and backing up to the partition 14. Seating portion 40 is located above a box-like compartment 42 positioned directly on the floor of the vehicle. As seen in FIGS. 2 and 3, as well as in FIGS. 4 and 5, this box-like compartment 42 contains an air-conditioner unit 44 and a forwardly disposed electrical converter/charger 46, both of any standard or conventional design.

With reference now to any of FIGS. 3 through 6 it will be seen that there is provided, in the floor 48 of the vehicle, closely adjacent the side wall 50 of same, a series of screened air inlet openings 52. Cool air entering the vehicle finds its way to the air inlets 52 by means of vertically disposed access openings 54 provided in vertically disposed structural panels of the vehicle as well as through the access opening provided when a lower, longitudinally extending, utility door 56 is opened when the vehicle is at rest. This elongated utility door 56 is illustrated in FIGS. 4 through 6 and is mounted to the lower side wall 50 of the vehicle by way of suitable hinges 58 providing a generally horizontally disposed hinge axis.

With continued reference to FIG. 3, a duct system 60 is defined above the screened inlet openings 52, such duct system being defined generally between the several appliances noted above including air conditioner 44, refrigerator 32, etc. and the outer side wall 50 of the vehicle. The perimeter of duct system 60 is shown by the broken lines 61 in FIG. 3. It should be realized that the duct system does not, except at selected locations, require any separate partition, except the partitions naturally formed by several of the appliances and by certain components of the kitchen facility 12. It will be readily apparent from a review of FIGS. 3 through 8 that the outer perimeter of the duct system 60 is provided mainly by the side wall 50 of the vehicle. The inner walls of the duct system are provided, starting from the forward end of the vehicle, firstly by the vertical partition 62 adjacent the converter/charger 46. Rearwardly of that, there is shown the back wall of the air conditioner unit 44, the back wall 64 being provided with a cool air inlet receiving air through the first of the screened inlet openings 52a. This back wall also is provided with a suitable outlet for air which has been warmed by the action of the air conditioner. A partition 65 extends into the air conditioning unit and across the duct system as seen in FIG. 3. thus causing the air flow to pass around the inner end of it as also seen in FIG. 3. The rear wall 66 of refrigerator 32 forms a further substantial portion of the wall of the duct system as best illustrated in FIG. 6. (The cooling fins and coils of the refrigerator are located in the duct system here). This wall is completed by a short portion of the top wall of the refrigerator coupled with vertical partition wall 68 and a rearward portion of the countertop 18 as best seen in FIG. 6. The rearward portions of the duct system will be described later in connection with the air flows associated with the water heater 34 and the vent for stove 22.

At this point the common exit outlet for the warm air and gases will be described. This common outlet is located in the side wall 50 of the vehicle adjacent the refrigerator 32 and the gas water heater 34. As best seen in FIG. 2, the outlet comprises a rectangular louvered outlet 70. A multiplicity of horizontally extending louver elements 72 are provided which extend across outlet 70. A suitable screen is located behind the louvers to prevent entry of insects etc. The rectangular louvered outlet 70 is effectively concealed or "blended in" by virtue of the two dark readily removable panes 74 with a readily removable vertical bar located between such panes, all positioned immediately below the outlet 70 and by the pair of correspondingly sized transparent window panes 28 located just above outlet 70, the lower edges of panes 28 being positioned immediately above the level of countertop 18 as previously noted. The entire assembly, including outlet 70 and panes 28 and 74, is surrounded by an attractive rectangular frame 76, the corners of which are suitably contoured, with the whole unit lying substantially flush with the associated side wall 50 of the vehicle. The entire assembly including the louvered outlet 70 and the associated panes 28 and 74 is located in the vicinity of the refrigerator 32 and the gas water heater 34.

With reference to FIG. 6, cool air rising through inlet 52 will sweep along the rear wall of refrigerator 32 picking up waste heat therefrom. In the case of an electric refrigerator, the heat emission coils 33 of the refrigerator will be exposed on the rear wall of same to the flow of air. Heat emitting portions of a liquid propane operated refrigerator will be similarly exposed. The air thus heated will pass outwardly of the vehicle between louvers 72.

In similar fashion, with reference to FIG. 7, cool air rising through one of the screened openings 52 will pass upwardly around the gas water heater, being confined by the duct system as defined by vehicle side wall 50, the removable panes 74 and the vertical partition wall 75 forming part of the kitchen facility 12 and positioned below the sink 20. The upper part of the duct system is also provided by faucet mounting means 77 part of which is provided by countertop 18, with the rising hot air and gases generated by the water heater 34 being deflected outwardly by a heat deflector 78 and the hot air and gases then passing outwardly between louvers 72 in the same manner as noted previously. The previously noted sink vent 31 also vents in this region and the gases escape via outlet 70 in the same manner.

The venting of the gas stove 22 is illustrated with reference to FIG. 8. The exhaust hood 26 positioned below horizontal shelf 24 was previously noted. Hood 26 is provided with an exhaust fan 80, of conventional design, which draws hot air and gases upwardly from the surface of the stove and into a downwardly extending narrow duct 82 defined between outer side wall 50 of the vehicle and inner partition portion 84. The duct entrance is provided with a conventional gravity damper 83 to prevent a back flow of air when the fan is not in use. The exhaust gases are forced downwardly by the fan 80 in the direction shown by the arrows until they reach a horizontally extending duct portion 86, reference also being had to FIG. 2. When the exhaust gases reach the horizontally disposed duct portion 86 they move forwardly a short distance until they reach the louvered outlet portion and there they are exhausted between louvers 72 along with the gases, etc. from the remaining appliances.

With reference again to FIG. 2 and FIG. 8, it will be seen that the downwardly extending duct 82 is defined between the outer wall 50 of the vehicle body and the inner wall 84 as well as between the vertically extending transverse walls 88 and 90 seen in FIG. 2. The forwardly extending duct portion 86 is again defined between the outer and inner walls 50 and 84 respectively and between the transversely extending horizontal wall portions 92 and 94 seen in FIG. 2. The remaining transverse walls 96, 97 and 98 as best seen in FIG. 2 define the remaining rear wall portions of the duct system generally.

With the integrated venting system described above, the cool air enters through the screened openings 52 in the floor of the vehicle and rises upwardly as the air becomes warmed to ultimately exit through the louvered outlet 70 as described above.

The air to cool the air conditioning unit 44 is drawn upwardly and subsequently forced partially sideways around the partition 65 which extends within the air conditioner. The warm air leaving the air conditioner 44 then moves upwardly and/or downwardly depending on the setting (high or low) of the air conditioning unit 44, and then moves outwardly through the opening 52b in the floor and/or the louvered outlet 70 above. The cool air noted above is firstly drawn from beneath the vehicle adjacent to the forward portion of the utility door 56 through inlet 52(a) and the air warmed by the air conditioning unit is subsequently discharged adjacent the rear portion of the utility door 56 via opening 52(b). A partition or divider 57 inside of and located halfway along the length of the utility door assists in keeping the outgoing warm air separated from the cool air incoming via inlets 52.

Normally the air conditioning unit only operates when the vehicle is parked; hence the utility door can be left partially open. However, the air conditioning unit could be operated while driving if the vehicle is equipped with a generator sufficient to operate such unit, in which event the utility door is left partly open.

The air flow behind the refrigerator 32, regardless of whether it is energized by electricity or liquid propane gas, is generally upwardly, and thence outwardly of louvered outlet 70, except that when the air conditioner 44 is running some air is being forced sideways, and then partly up and partly down and out through the open utility door 56 below the floor level. Again, the cooling effect is the same or better.

The flow of cooling air and gases associated with the liquid propane gas fired water heater 34 is through and around the heater before exiting through the louvered outlet 70. The air and gases collected by the hood 26 over the stove are drawn upwardly by fan 80 and subsequently forced downwardly and forwardly through the duct system described above before exiting through the louvered outlet 70.

The presence of the panes of glass 28 and 74 above and below the louvered outlet 70 effectively conceals the outlet and gives the entire unit the appearance of a regular window unit. In addition to concealment, the removable panes 74 perform an additional function in that, once removed, they permit access to the adjacent appliances namely the refrigerator 32 and the propane fired water heater 34 for installation, repair and adjustment.

A specific embodiment of the invention has been described by way of example. Those skilled in this art will realize that numerous changes and modiciations may be made while still remaining within the scope of the invention. For definitions of the invention, reference should be had to the claims appended hereto.

I claim:

1. A recreational vehicle, mobile home or the like having a plurality of appliances therein which generate heat and/or gases and an integrated venting system in said vehicle comprising cool air inlet means in a lower portion of the vehicle body, a common warm air outlet in another portion of the vehicle body located at a level above the cool air inlet means; and means located between the air inlet means and said warm air outlet for confining a flow of air therein and causing the air flow to pass in contact with or in close proximity to said plurality of appliances whereby to remove heat and/or gases therefrom as the air moves from the air inlet means to and through the common warm air outlet.

2. The vehicle of claim 1 wherein said air inlet means comprise openings in or adjacent to floor portions of the vehicle.

3. The vehicle of claim 1 wherein said common warm air outlet is located in a side wall of the vehicle body.

4. The vehicle of claim 3, said common air outlet having louvers covering the same to partly conceal the air outlet.

5. The vehicle of claim 4 further including window units closely adjacent the louver covered outlet to further conceal said outlet from view, certain of said units being removable so as to allow access to the vehicle interior for installation and/or servicing of certain of said appliances.

6. The vehicle of claim 1 wherein said appliances include a stove, an exhaust hood above said stove and an exhaust duct and fan associated with said hood to withdraw heat fumes from the stove, said exhaust duct being connected to said means for confining the flow of air such that heat and fumes from the stove may be brought outwardly through said common air outlet, the latter being disposed at a level below that of said exhaust hood.

7. The vehicle of claim 6 wherein said common warm air outlet is located in a side wall of the vehicle body.

8. The vehicle of claim 7, said common air outlet having louvers covering the same to partly conceal the air outlet.

9. The vehicle of claim 8 further including window units closely adjacent the louver covered outlet to further conceal said outlet from view, certain of said units being removable so as to allow access to the vehicle interior for installation and/or servicing of certain of said appliances.

10. The vehicle of claim 7 wherein said air inlet means comprise openings in or adjacent to floor portions of the vehicle.

11. The vehicle of claim 1 wherein said vehicle has a kitchen facility located adjacent one side wall of the vehicle body with said appliances forming part of such facility, said means confining the flow of air therein comprising a main duct common to said plurality of appliances and defined between said kitchen facility and said side wall of the vehicle body.

12. The vehicle of claim 11 with heat and/or gas emitting portions of said appliances being located within said duct system to effect cooling/venting thereof on movement of air through said system.

13. The vehicle of claim 12 wherein said appliances include a stove, an exhaust hood above said stove and an exhaust duct and fan associated with said hood to withdraw heat and fumes from the stove, said exhaust duct being connected to said duct system such that heat and fumes from the stove may be brought outwardly through said common air outlet, the latter being disposed at a level below that of said exhaust hood.

14. The vehicle of claim 12 wherein portions of said appliances together with said side wall form a portion of said main duct system, said common air outlet being in said side wall and said air inlet means comprising openings in the floor of said vehicle.

15. The vehicle of claim 14 wherein said common warm air outlet is located in a side wall of the vehicle body.

16. The vehicle of claim 15, said common air outlet having louvers covering the same to partly conceal the air outlet.

17. The vehicle of claim 16 further including window units closely adjacent the louver covered outlet to further conceal said outlet from view, certain of said units being removable so as to allow access to the vehicle interior for servicing of certain of said appliances.

18. The recreational vehicle of claim 1 including an air conditioning unit and means directing the flows of air such that during operation of said unit, cool air enters through certain of the air inlet means while air warmed by said unit exits through other of said air inlet means.

19. A recreational vehicle, mobile home or the like having a plurality of appliances therein which generate heat and/or gases and a venting system in said vehicle comprising cool air inlet openings in or adjacent to floor portions of the vehicle body, a common warm air outlet in a side wall of the vehicle body located at a level above the cool air inlet means; and means located between the air inlet means and said common warm air outlet for confining a flow of air therein and causing the air flow to pass in contact with or in close proximity to said appliances whereby to remove heat and/or gases therefrom as the air moves from the cool air inlet means to and through the common warm air outlet, and wherein said vehicle has a kitchen facility located adjacent the side wall of the vehicle body with said appliances forming part of such facility, said means confining the flow of air therein comprising a main duct common to said appliances and defined between said kitchen facility and said side wall of the vehicle body.

20. The vehicle of claim 19, said common air outlet having louvers covering the same to partly conceal the air outlet.

21. The vehicle of claim 20 further including window units closely adjacent the louver covered outlet to further conceal said outlet from view.

22. The vehicle of claim 19 wherein portions of said appliances together with said side wall of the vehicle body from a portion of said main duct system.

23. The vehicle of claim 20 further including window units closely adjacent the louver covered outlet to further conceal said outlet from view, certain of said units being removable so as to allow access to the vehicle interior for servicing of certain of said appliances.

* * * * *